United States Patent
Heilig et al.

(10) Patent No.: US 12,325,152 B2
(45) Date of Patent: Jun. 10, 2025

(54) DRIVE TRAIN FOR A MIXER DRUM AND CONTROL DEVICE FOR SUCH A DRIVE TRAIN

(71) Applicant: ZF Friedrichshafen AG, Friedrichshafen (DE)

(72) Inventors: Eduard Heilig, Friedrichshafen (DE); Udo Gillich, Tettnang (DE); Marcel Liesel, Friedrichshafen (DE); David Wörzler, Langenargen (DE); Raphael Zohner, Hünfelden (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 925 days.

(21) Appl. No.: 17/599,951

(22) PCT Filed: Mar. 12, 2020

(86) PCT No.: PCT/EP2020/056619
§ 371 (c)(1),
(2) Date: Sep. 29, 2021

(87) PCT Pub. No.: WO2020/200684
PCT Pub. Date: Oct. 8, 2020

(65) Prior Publication Data
US 2022/0152871 A1 May 19, 2022

(30) Foreign Application Priority Data
Mar. 29, 2019 (DE) .......... 102019204435.2

(51) Int. Cl.
*B28C 5/42* (2006.01)
*B60L 1/00* (2006.01)
*B60L 50/61* (2019.01)
*B60L 53/14* (2019.01)

(52) U.S. Cl.
CPC ............ *B28C 5/4206* (2013.01); *B60L 1/003* (2013.01); *B60L 50/61* (2019.02); *B60L 53/14* (2019.02); *B60L 2200/28* (2013.01); *B60L 2200/36* (2013.01)

(58) Field of Classification Search
CPC ........ B28C 5/4206; B60L 1/003; B60L 50/61; B60L 53/14; B60L 2200/28; B60L 2200/36; Y02T 10/62; Y02T 10/7072; Y02T 10/70; Y02T 90/14
See application file for complete search history.

(56) References Cited

U.S. PATENT DOCUMENTS

| | | | |
|---|---|---|---|
| 2011/0316332 A1* | 12/2011 | Karnatz ............... | B60L 7/14 307/9.1 |
| 2014/0015315 A1* | 1/2014 | Takahashi .......... | B60R 16/0307 307/10.1 |
| 2022/0152871 A1* | 5/2022 | Heilig ................. | B60L 50/61 |
| 2023/0212838 A1* | 7/2023 | Glöckner ............. | E02F 9/26 701/22 |
| 2023/0302681 A1* | 9/2023 | Heilig ................. | B28C 5/421 |

FOREIGN PATENT DOCUMENTS

| | | | |
|---|---|---|---|
| CN | 108789843 A | * | 11/2018 |
| DE | 202009001045 U1 | | 7/2010 |
| DE | 202014002195 U1 | | 4/2014 |
| DE | 102013004709 A1 | | 9/2014 |
| DE | 102010047314 B4 | | 10/2014 |
| DE | 202014102494 U1 | | 10/2015 |
| DE | 102019212048 A1 | * | 2/2021 |
| EP | 2719510 A1 | | 4/2014 |
| EP | 2807007 B1 | | 5/2018 |

OTHER PUBLICATIONS

International Search Report and Written Opinion for PCT/EP2020/056619 mailed Jul. 9, 2020 (14 pages; with English translation).

* cited by examiner

*Primary Examiner* — Charles Cooley
(74) *Attorney, Agent, or Firm* — Kristin L. Murphy

(57) ABSTRACT

A drive train for a mixer drum comprises a generator which outputs a first alternating voltage to a first converter. The first converter is connected to a high-voltage direct voltage network. A second converter is also provided which is connected to the high-voltage direct voltage network and which supplies an electric motor with a second alternating voltage in order to drive the mixer drum. The drive train also comprises a high-voltage battery which is connected to the high-voltage direct voltage network. Finally, a control unit is also provided which is connected to the first and second power converters or the battery and thus controls a flow of energy via the high-voltage direct voltage network.

17 Claims, 2 Drawing Sheets

DRIVE TRAIN FOR A MIXER DRUM AND CONTROL DEVICE FOR SUCH A DRIVE TRAIN

CROSS-REFERENCE TO RELATED APPLICATIONS

This application is a national stage of International Application No. PCT/EP2020/056619, filed Mar. 12, 2020, the disclosure of which is incorporated herein by reference in its entirety, and which claimed priority to German Patent Application No. 102019204435.2, filed Mar. 29, 2019, the disclosure of which is incorporated herein by reference in its entirety.

TECHNICAL FIELD

The disclosure relates to a drive train for a mixer drum and to a control device for such a drive train.

BACKGROUND

EP 2 807 007 B1 discloses a truck mixer having a device for rotating the drum of the concrete mixer. In this case, the drum is driven by an electric motor. The electric motor is supplied AC voltage via an inverter, wherein the inverter draws its energy from a battery. The battery can be supplied power via a generator or an electrical grid. For this purpose, corresponding rectifiers are then provided. In addition, recuperation from the traction drive train for charging the battery is known.

EP 2 719 510 A1 discloses a drive train for a concrete mixer. In this case, this drive train comprises an electric motor, a connection to an electrical grid. In addition, the drive train comprises a generator for generating electrical power and a battery. Furthermore, an inverter is provided, which supplies power to the electric motor for driving a drum.

SUMMARY

The disclosure is directed to a drive train for a mixer drum or a control device. An advantage over the above prior art is that the disclosure allows for a high degree of flexibility of the electrical energy supply for the drum drive. For example, a control device is provided which is connected to power converters and a battery and, if appropriate, further components and in this case controls an energy flow over a high-voltage DC grid. A power converter is connected to this high-voltage DC grid and then supplies AC voltage to an electric motor. This high degree of flexibility by virtue of the high-voltage grid and the control by virtue of the control device enable a favorable and flexible configuration of the drive train. Thus, conventional components can be used.

Therefore, a drive train is proposed which is intended for a mixer drum, comprising a generator, which outputs an AC voltage to a first power converter, wherein the first power converter is connected to a high-voltage DC grid. The drive train furthermore has a second power converter, which is likewise connected to the high-voltage DC grid and which supplies a further AC voltage to the electric motor for driving the mixer drum. Furthermore, a high-voltage battery is provided which is connected to the high-voltage DC grid. In addition, the control device is provided which is connected to the first and second power converters and/or the battery and therefore controls an energy flow over the high-voltage DC grid. That is to say that the control device presets which component outputs how much energy to the high-voltage DC grid. For this purpose, the control device can use values of the components.

Furthermore, a corresponding control device for this drive train is also proposed.

Here, for the purposes of understanding the disclosure, a drive train is understood to mean a combination of components which are necessary for driving the mixer drum. The drive train can of course furthermore comprise further components which are not necessary for the definition of the disclosure, however.

The mixer drum is a known drum in which concrete or cement or another material is subjected to a rotation in order to correspondingly mix this material. This material is then generally used on construction sites for constructing buildings or other works. A mixer drum is conventionally positioned on a so-called trailer, which is moved by a tractor. Alternatively, it may also be an integral mixer vehicle, a so-called fixed bodywork: tractor and trader are not separated or separable.

Here, a generator is understood to mean a device which generates AC voltage from DC voltage. For this purpose, an asynchronous machine may be used and be connected as a generator. The asynchronous machine is a simple design and reliably provides the corresponding AC voltage. This AC voltage is generally three-phase.

A power converter is in particular understood to mean inverters which generate DC voltage from AC voltage, or vice versa. Such inverters have a DC voltage component with a so-called intermediate circuit and a further component, which generates an AC voltage from the DC voltage by virtue of power switching elements being provided there which virtually chop the DC voltage and therefore convert an AC voltage.

In one exemplary arrangement, a high-voltage DC grid is understood to mean an electrical connection which exists between the components and at which a voltage of 650 V is present. This voltage has proven to be very advantageous since it is associated with low line losses. This means that the components which are connected to this high-voltage DC grid take up or output a voltage of 650 V.

Also, here, the electric motor is understood to mean an asynchronous machine and is therefore supplied the correspondingly three-phase AC voltage from the second power converter. Generally, if necessary, the electric motor is not connected directly to the mixer drum, but via a gear mechanism, and in one exemplary arrangement, a reduction gear mechanism.

The high-voltage battery should be understood to mean a battery which is configured such that it outputs the voltage at 650 V. Such a battery has, for example, a capacity of 32 kWh. During operation, for example, a continuous power of 50 kW and a short-term peak power of 80 kW can be retrieved. Here, as illustrated below, a so-called battery management system is also provided, which is firstly ensured at the control device of the battery itself, but also by the control device, with which the battery control device communicates via a CAN bus, for example. Therefore, the existing quantity of energy in the battery and the electrical parameters are tested, plausibility-checked, and determined.

The control device according to the disclosure is understood to mean a control device which is connected to the power converters and/or the battery and in this case controls the energy flow over the high-voltage DC grid. This is provided by the control device by virtue of it taking or connecting individual components of this high-voltage DC grid or influencing them in the uptake or output of energy.

For this purpose, the control device is data-connected to these components, for example via a CAN bus or a direct data link or another bus.

Here, energy flow should be understood to mean the flow of electrical energy over the high-voltage DC grid.

The control device per se picks up these signals as sensor signals, wherein these signals can be already processed sensor signals, and generates therefrom control signals for the energy flow. There are naturally also further signals available, for example a user input (not illustrated) which influences the control device in terms of its functions. For this, the control device has a computer, and in one exemplary arrangement, a microcontroller, interfaces and may also include a housing.

Advantageous exemplary configurations of the disclosure are defined by the dependent claims.

Provision is made for a DC-DC converter to be connected to the high-voltage DC grid which derives a low voltage from the high-voltage DC voltage for supplying power to further components. Such a low voltage is, for example, 24 V and is therefore within a range of from 20 to 40 V. However, other voltage ranges are also possible. In one exemplary arrangement, the DC-DC converter is DC-isolated so that there is no direct electrical connection between the low voltage and the high voltage. This can be performed inductively, for example, but a capacitive solution is also possible.

Furthermore, provision is made for the further components to be a chute adjustment device or a driven drum lid or a cooling system. The chute adjustment device is intended for the outflow of construction material, and this flows through a pipe, which is here referred to as a chute. The driven drum lid needs to be closed when the concrete mixer is traveling downhill, for example, so that no construction material emerges through the lid. For these components, the power from the on-board power supply system of the tractor is insufficient by far. Therefore, this solution using the further DC-DC converter is advantageous. Alternatively, it is possible for a separate 24 V battery or another low-voltage battery to be used.

Furthermore, provision is made for an on-board charger to be connected to the high-voltage DC grid which rectifies a connected external AC voltage and converts it into the high-voltage DC voltage. Therefore, in the standstill state, for example overnight, the battery can be charged or else, on failure of the battery, a direct power supply to the high-voltage DC grid can be produced.

In addition, it is possible for a DC voltage terminal to be present which is connected to the high-voltage DC grid and converts an external DC voltage into the high-voltage DC voltage. For this purpose, too, a corresponding DC-DC converter then needs to be provided which may also has DC isolation.

Furthermore, it is advantageous that the control device is connected to the on-board charger and/or the DC voltage terminal in order to regulate the energy flow over the high-voltage DC grid.

In addition, provision is made for the control device to furthermore have at least the following functions: speed regulation for the mixer drum, monitoring for a maximum speed of the mixer drum, further monitoring for a preset direction of rotation, holding of the mixer drum, compensation for an uneven distribution of a material, i.e. the construction material in the mixer drum, and torque regulation for the mixer drum. These functions are provided in addition to the regulation of the energy flow over the high-voltage DC grid. With the speed regulation, there is a response to an input by a user by virtue of the mixer drum then being adjusted to this speed. This can also take place on the side of the system, depending on the configuration. The monitoring for the maximum speed is a safety function in order that such a maximum speed is not exceeded. The holding of the mixer drum may be necessary in certain operating states and is then set by this control device. The compensation for an uneven distribution of the construction material in the mixer drum is also a function which can be used; for example, regularly when a mixer drum is being filled. Torque regulation also needs to be provided, depending on the application, by the control device.

In this case, the control device is connected to the second power converter, which itself has signal processing in order to implement such demands. The second power converter can in this case also have, at least rudimentarily, such functions themselves in order to then implement them via the electric motor. These functions ensure that the electric motor is correspondingly controlled. The speed and the torque of the mixer drum are determined via the electric motor.

Furthermore, provision is made for the second power converter to transmit data to the control device, wherein the data are derived at least from the following values: a first temperature value of the electric motor, which in particular reflects the temperature of the coils, and/or a second temperature value of the power converter itself and/or a speed of the electric motor, from which the speed of the mixer drum can then be derived. As illustrated above, the power converter can already preprocess these values and then transmit them correspondingly to the control device. For this purpose; corresponding temperature sensors and speed sensors are provided which provide these values directly or indirectly.

Furthermore, provision is made for the first and the second power converters and the DC-DC converter to be accommodated together in a switchgear cabinet. Therefore, all of the power electronics and also control devices and in addition the DC-DC converter the high-voltage DC grid with corresponding fuses and the low-voltage distribution can be accommodated in a switchgear cabinet. Therefore, then all of the electronic components are additionally protected from the very high everyday demands of a construction site.

Furthermore, provision is made for at least one pilot contact to be provided which in each case connects components of the drive train on the tractor and the trailer. In this case, it is necessary to avoid a situation whereby arcs or hazardous situations arise when the components on the tractor and the trailer are physically separated. In this case, arcs or electric shocks could occur. This is prevented by the pilot contact. This pilot contact is intended, when the connection is drawn under load, to interrupt the control current for equipment or to trip a contactor in order to isolate the circuit at a switch constructed for this purpose before this takes place at the plug-type connection. The pilot contact is there to connect the plug to the neutral conductor. Thus, a contactor drive can be connected to the neutral conductor via one of the outer conductors and thus disconnect the device prior to the plug contacts being separated. The contactor or else switching contactor is an electrically or electromagnetically operated switch for a high electrical power and is similar to a relay. The contactor has two switch positions and switches without any particular provisions in the normal case in monostable fashion.

BRIEF DESCRIPTION OF DRAWINGS

Exemplary arrangements of the disclosure are illustrated in the drawings and will be explained in more detail in the description below, in which.

DETAILED DESCRIPTION

Figure 1:
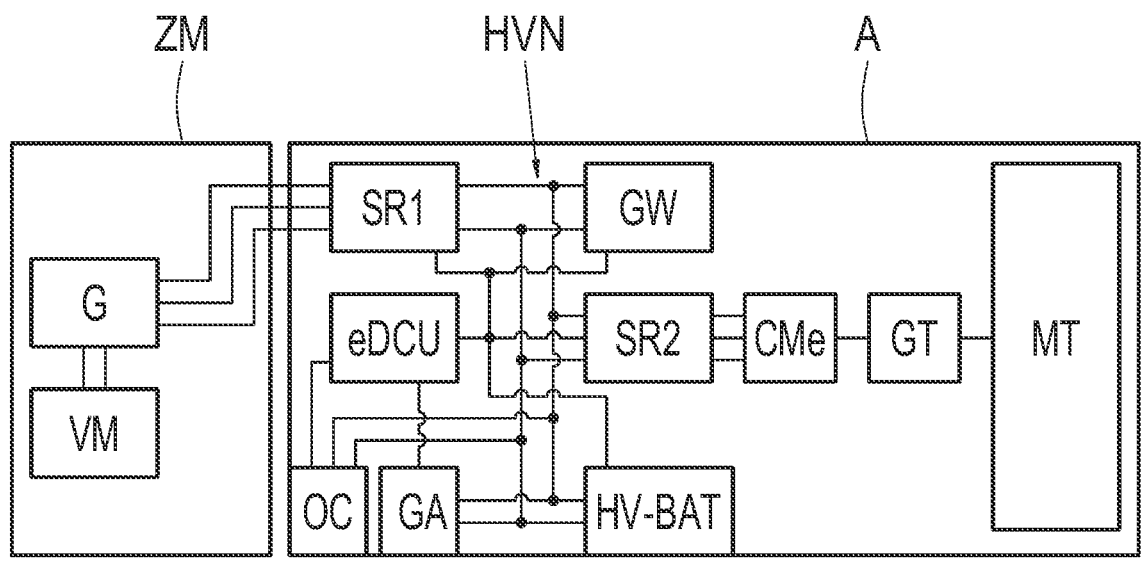
FIG. 1 shows a block circuit diagram of the drive train according to an exemplary arrangement.

FIG. 1 illustrates a block circuit diagram of the drive train according to the disclosure. Illustrated schematically are a tractor ZM and a trailer A. An internal combustion engine VM, which drives a generator G, is located in the tractor ZM. Therefore, the generator G can generate alternating current, which is transmitted in three-phase fashion to a first power converter SR1, wherein the power converter SR1 is located in the trailer. Elements such as, for example, other parts of the drive train which are connected to the internal combustion engine VM are not illustrated here.

A pilot contact is provided between the generator G and the power converter SR1 at the interface between the tractor ZM and the trailer A, which pilot contact prevents an arc from forming, for example during separation of this contact.

The power converter SR1 converts a high-voltage direct current, for example at 650 V, from an alternating current from the generator G. The power converter SR1 applies this direct current to a high-voltage DC grid HVN, to which further components are connected. An example of a connected component is a DC-DC converter GW, which has DC isolation, which is achieved magnetically or capacitively, for example. This DC-DC converter supplies a low voltage, for example 24 V, to further components which would overload an on-board power supply system of the tractor ZM. These components include a so-called chute adjustment device and/or a drum lid and/or a cooling system or further components which also need to be supplied such a low voltage.

Furthermore, a second inverter SR2 or power converter is connected to the high-voltage DC grid HVN, which inverter or power converter forms an AC voltage for the electric motor CMe from the high-voltage DC voltage. The electric motor CMe is connected to a mixer drum MT via a gear mechanism GT in order to rotate this mixer drum. The high-voltage DC grid HVN and the intermediate circuit of the inverter SR2 are at the same potential.

What is not illustrated is the fact that the electric motor CMe transmits sensor values, such as, for example the temperature of the winding or else the speed, to the power converter SR2, for example via a separate cable (not illustrated). The sensor values from the power converter SR2 either passes on to a control device eDCU or already further-processes and then transmits to the control device eDCU or even itself activates a function from these measured values, for example a change in the speed, a reduction in the electrical energy supplied or other measures. The power converter SR2 can also transmit other data to the control device eDCU. The control device eDCU is connected, for example via a CAN bus, to various components of the drive train, namely the power converter SR1, a rectifier GW, the power converter SR2, the battery HV-BAT, a DC terminal GA and an on-board charger OC. The control device eDCU has interfaces and a computation mechanism, such as a microcontroller, which processes the data of the connected devices and from this derives control signals by various functions. First, the control device eDCU controls the energy flow in the high-voltage DC grid. This proceeds, in the simplest case, by virtue of individual components being instructed to draw or provide energy or to no longer do this. Furthermore, it is possible that even this can take place in stages. That is to say that more or less energy can be provided or drawn. In addition, however, the control device has yet further functions. These include, for example, setting of the speed, setting of the torque, monitoring for a maximum permissible speed, ensuring a standstill of the drum, compensating for construction material in the drum in respect of its distribution, and further functions which can be performed by this control device.

The high-voltage DC grid is also supplied energy from the high-voltage battery HV-BAT. For this purpose, the high-voltage battery HV-BAT has contactors, but also a battery control device or at least one function which is associated with the control device eDCU. Thereby, the remaining energy contained in the battery HV-BAT and also the electrical parameters can be transmitted or else plausibility-checked. In the event of an excess energy on the high-voltage DC grid HVN, the battery HV-BAT can be charged therefrom.

Furthermore, the on-board charger GC and the DC voltage terminal GA are connected to the high-voltage DC grid. The on-board charger OC is intended for a steady-state AC voltage source such as the electrical grid to be connected to the trailer A in order for it to be possible for it to be charged therefrom, for example, when the concrete mixer is parked in its parking place, and in particular in this case the high-voltage battery HV-BAT. The DC voltage terminal GA is provided for the same purpose when there is a DC voltage source via which the high-voltage DC grid HVN can also then be supplied energy.

In one exemplary arrangement, a length of the electric motor CMe and the gear mechanism GT has been found to be a value of 685 mm. This length has been found to result in a space-saving configuration.

Figure 2:
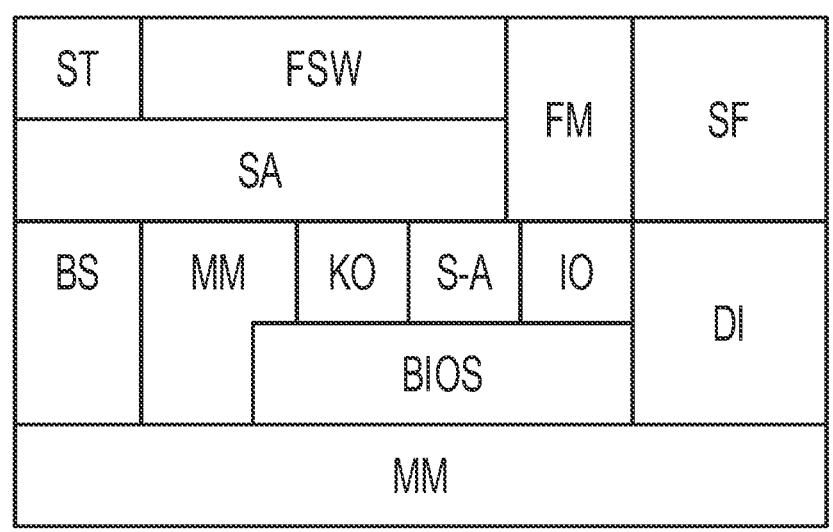
FIG. 2 shows a layer model of software on a control device.

FIG. 2 illustrates a layer model of software which is used on the control device eDCU. The microcontroller hardware is present as the lowermost layer MH. Then there is an operating system BS, the so-called Basic Input/Output System BIOS, a memory management MM and a diagnosis DI as the next layers. Above the BIOS, there is furthermore also a communications layer KO, a sensor actuator layer S-A and an input/output system layer 10.

Above these elements there is a signal abstraction layer SA, in which signals from the motor VM, from the power converters SR1 and SR2 and from the DC-DC converter GW, the battery HV-BAT, the electric machine CMe and other components are provided. Above the signal abstraction layer SA, there is then an important layer: a function software FSW, in which, as illustrated above, the energy flow management but also the control of the drum is provided with the different functions. Furthermore, error handling FH is also provided as well as a safety function SF and a statistic function ST. The signal abstraction layer SA ensures that all of the signals in the layer relevant for the function software FSW arrive in appropriately scaled and error-handled fashion. Furthermore, the control device eDCU ensures that booting-up and shutting-down of the entire system is controlled and monitored. For example, the control device eDCU can charge the battery in driving states in which there is less traction drive power, so that the destination is reached with the battery charged and the driver can switch off the internal combustion engine.

Figure 3:
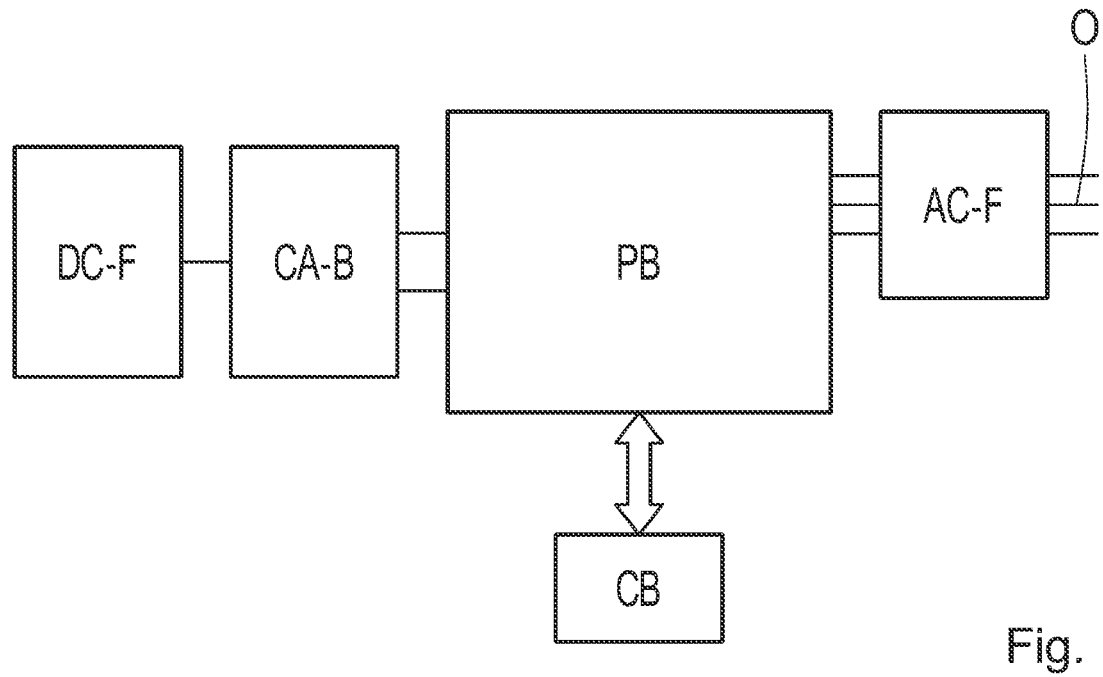
FIG. 3 shows a schematic illustration of a power converter.

FIG. 3 shows, in a block circuit diagram in simplified form, a power converter, such as, for example, SR2 as inverter. First, a DC voltage filter DC-F is provided at the input, and a capacitance circuit, for example for filtering out harmonics, is connected to said DC-voltage filter. In a power section PB in which the power switches are located, for example interconnected in a bridge circuit B6, the AC voltage is generated, in this case in three phases, from the DC voltage of the intermediate circuit. In this case, the principle of chopping is used. By a control function CB, a power board PB is driven and also values regarding, for example, heat development etc. are taken. As illustrated above, the control function CB is connected to the control device eDCU, but also to the electric motor CMe in order to pick up sensor values and to transmit further signals. The power board PB is connected on the output side to an AC filter AC-F, which is then connected to the electric motor at the output O. The filters AC-F and DC-F are provided for filtering out high frequency components.

Figure 4:
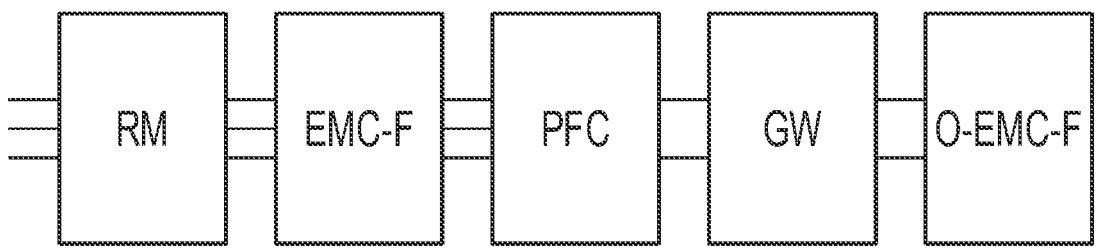
FIG. 4 shows a schematic illustration of an on-board charger.

FIG. 4 shows the basic design of the on-board charger. The alternating current is taken up from the external AC source via a so-called relay matrix RM. Then, the alternating current passes into the rectifier PFC via a filter EMC-F. The rectified voltage is then converted into the high-voltage DC voltage in the DC-DC converter GW, which in turn is DC-isolated, in order then to now be applied to the output filter O-EMC-F.

Figure 5:
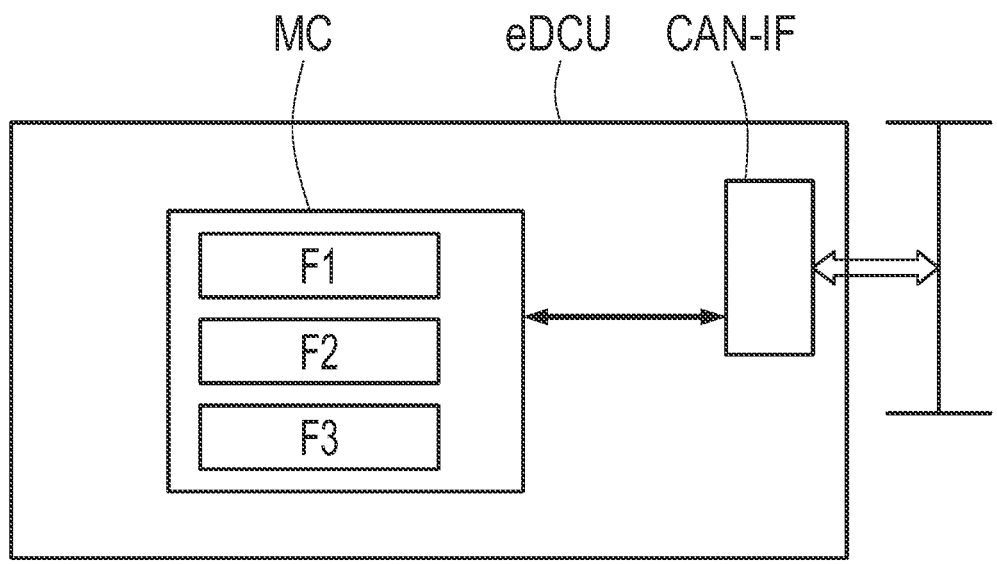
FIG. 5 shows a block circuit diagram of the control device.

FIG. 5 shows, in a block circuit diagram, the control device eDCU according to the disclosure, which is generally located in a housing. Only the components which are necessary for understanding the disclosure are illustrated here. Data are received and transmitted via a bus interface CAN-IF for the so-called CAN bus. The microcontroller μC is connected to this interface, on which microcontroller, for example, functions F1, F2 and F3 are provided as illustrated above, and these functions are applied by the microcontroller using the data flowing thereto. As illustrated above, one of the most important functions is to control the energy flow over the high-voltage DC grid HVN. As illustrated above, the control device eDCU is also connected to an input interface, via which, for example, an operator can input instructions regarding the drum behavior and other components. These instructions are then implemented here corresponding to the sensor values and available functions.

The invention claimed is:

1. A drive train for a mixer drum comprising:
   a generator, which outputs a first AC voltage to a first power converter, wherein the first power converter is connected to a high-voltage DC grid;
   a second power converter, which is connected to the high-voltage DC grid and which supplies a second AC voltage to an electric motor for driving the mixer drum;
   a high-voltage battery, which is connected to the high-voltage DC grid;
   a control device, which is connected to the first and second power converters and/or the battery and therefore controls an energy flow over the high-voltage DC grid; and
   a DC voltage terminal, is connected to the high-voltage DC grid and wherein the DC voltage terminal converts an external DC voltage into a high-voltage DC voltage.

2. The drive train as claimed in claim 1, a DC-DC converter is connected to the high-voltage DC grid and derives a low voltage from a high-voltage DC voltage from the high-voltage DC grid for supplying power to further components.

3. The drive train as claimed in claim 2, wherein the further components are a chute adjustment device and/or a drum lid and/or a cooling system.

4. The drive train as claimed in claim 2, wherein the first and the second power converters and the DC-DC converter are accommodated together in a switchgear cabinet.

5. The drive train as claimed in claim 2, further comprising a DC voltage terminal connected to the high-voltage DC grid and wherein the DC voltage terminal converts an external DC voltage into the high-voltage DC voltage.

6. The drive train as claimed in claim 5, wherein the further components are a chute adjustment device and/or a drum lid and/or a cooling system.

7. The drive train as claimed in claim 2, wherein the control device has at least the following functions: speed regulation for the mixer drum, first monitoring for a maximum speed of the mixer drum, second monitoring for a preset direction of rotation of the mixer drum, holding of the mixer drum, compensation for an uneven distribution of a material in the mixer drum, and torque regulation of the mixer drum.

8. The drive train as claimed in claim 1, wherein an on-board charger is connected to the high-voltage DC grid, wherein the on-board charger rectifies a connected external AC voltage and converts the external AC voltage into a high-voltage DC voltage.

9. The drive train as claimed in claim 8, wherein the control device is connected to the on-board charger in order to regulate the energy flow.

10. The drive train as claimed in claim 1, wherein the control device is connected to the DC voltage terminal in order to regulate the energy flow.

11. A drive train for a mixer drum comprising:
    a generator, which outputs a first AC voltage to a first power converter, wherein the first power converter is connected to a high-voltage DC grid;
    a second power converter, which is connected to the high-voltage DC grid and which supplies a second AC voltage to an electric motor for driving the mixer drum;
    a high-voltage battery, which is connected to the high-voltage DC grid; and
    a control device, which is connected to the first and second power converters and/or the battery and therefore controls an energy flow over the high-voltage DC grid;
    wherein the control device has at least the following functions: speed regulation for the mixer drum, first monitoring for a maximum speed of the mixer drum, second monitoring for a preset direction of rotation of the mixer drum, holding of the mixer drum, compensation for an uneven distribution of a material in the mixer drum, and torque regulation of the mixer drum.

12. The drive train as claimed in claim 11, the second power converter transmits data to the control device, wherein the data is derived at least from a first temperature value of the electric motor.

13. The drive train as claimed claim 11, wherein the second power converter transmits data to the control device, wherein the data is derived at least from the following values: a first temperature value of the electric motor and a second temperature value of the second power converter.

14. The drive train as claimed in claim 13, wherein the data is also derived from a speed of the electric motor.

15. The drive train as claimed in claim 11, wherein the second power converter transmits data to the control device, wherein the data is derived at least from one of the following values: a first temperature value of the electric motor, or a second temperature value of the second power converter or a speed of the electric motor.

16. A drive train for a mixer drum comprising:
- a generator, which outputs a first AC voltage to a first power converter, wherein the first power converter is connected to a high-voltage DC grid;
- a second power converter, which is connected to the high-voltage DC grid and which supplies a second AC voltage to an electric motor for driving the mixer drum;
- a high-voltage battery, which is connected to the high-voltage DC grid;
- a control device, which is connected to the first and second power converters and/or the battery and therefore controls an energy flow over the high-voltage DC grid; and
- at least one pilot contact is provided which in each case connects components of the drive train on a tractor and a trailer.

17. The drive train as claimed in claim 16, wherein the pilot contact is provided between the generator and the power converter at an interface between the tractor and the trailer.

* * * * *